United States Patent
Walker et al.

(10) Patent No.: US 10,769,237 B2
(45) Date of Patent: *Sep. 8, 2020

(54) SYSTEMS AND METHODS OF CORRELATING SATELLITE POSITION DATA WITH TERRESTRIAL FEATURES

(71) Applicant: Freeport-McMoRan Inc., Phoenix, AZ (US)

(72) Inventors: Mary Amelia Walker, Phoenix, AZ (US); Robert Catron, Phoenix, AZ (US); Brian Vaughan, St. Louis, MO (US); Hung Jung Lu, St. Louis, MO (US)

(73) Assignee: Freeport-McMoRan Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,720

(22) Filed: Oct. 2, 2019

(65) Prior Publication Data

US 2020/0034404 A1 Jan. 30, 2020

Related U.S. Application Data

(60) Division of application No. 15/984,930, filed on May 21, 2018, now Pat. No. 10,474,731, which is a
(Continued)

(51) Int. Cl.
*G06F 17/15* (2006.01)
*G01S 19/50* (2010.01)
*G01S 19/42* (2010.01)

(52) U.S. Cl.
CPC ............ *G06F 17/15* (2013.01); *G01S 19/42* (2013.01); *G01S 19/50* (2013.01)

(58) Field of Classification Search
CPC .......... G01S 19/38; G01S 19/39; G01S 19/40; G01S 19/42; G01S 19/421; G01S 19/423;
(Continued)

(56) References Cited

U.S. PATENT DOCUMENTS 5,848,374 A * 12/1998 Wakabayashi ......... G01C 15/00
701/455
7,881,730 B2 * 2/2011 Sheha ..................... G01S 19/42
455/456.1
(Continued)

FOREIGN PATENT DOCUMENTS

| CN | 102147261 B | 7/2013 |
| CN | 102147260 B | 12/2014 |
| WO | 2014143058 A1 | 9/2014 |

OTHER PUBLICATIONS

Chinese Office Action, Dated Dec. 4, 2019, with full English translation, Chinese Patent Application No. 201780038248.9, corresponding PCT/US2017/037044, 13 pages.
(Continued)

*Primary Examiner* — Young T Tse
(74) *Attorney, Agent, or Firm* — Fennemore Craig, P.C.

(57) ABSTRACT

A method of correlating satellite position data with terrestrial features may include the steps of: Defining a two-dimensional grid comprising a plurality of grid points at defined locations; rounding the satellite position data to the nearest grid point of the defined two-dimensional grid to create an amplitude data table, each rounded satellite position data point in the amplitude data table defining a reference grid point value; matching the terrestrial survey data to at least four adjacent grid points of the defined two-dimensional grid to create a terrestrial coordinate table; merging the amplitude data table and the terrestrial coordinate table
(Continued)

based on the reference grid point values to form a merged table; searching the merged table to identify the grid point with the minimum distance between an (x,y) location and an (rx, ry) location; and snapping the (x,y) location to a snapping point.

9 Claims, 5 Drawing Sheets

Related U.S. Application Data continuation of application No. 15/618,594, filed on Jun. 9, 2017, now Pat. No. 10,002,109.

(60) Provisional application No. 62/354,183, filed on Jun. 24, 2016.

(58) Field of Classification Search
CPC ........ G01S 19/425; G01S 19/50; G06F 17/10; G06F 17/15
USPC ......... 375/142, 150, 259, 343; 342/107–109, 342/357.2, 357.22, 357.23; 370/350; 455/427, 456.1; 708/5, 813
See application file for complete search history.

(56) References Cited

U.S. PATENT DOCUMENTS

| | | | |
|---|---|---|---|
| 9,183,438 B1* | 11/2015 | Dhein | G06T 11/60 |
| 2010/0309051 A1* | 12/2010 | Moshfeghi | H04W 4/029 342/378 |

OTHER PUBLICATIONS

Australian Examination Report, dated Dec. 5, 2019, Australian Patent Application No. 2017280912, corresponding to PCT/US2017/037044, 3 pages.

Jing Yuan Et Al: "An Interactive-Voting Based Map Matching Algorithm", Mobile Data Management (MDM), 2010 Eleventh International Conference on, IEEE, Piscataway, NJ, USA, May 23, 2010, pp. 43-53, XP031693107, ISBN: 978-1-4244-7075-4 *the whole document*.

Mohammed A. Quddus Et Al: "A High Accuracy Fuzzy Logic Based Map Matching Algorithm for Road Transport", Journal of Intelligent Transportation Systems, vol. 10, No. 3, Sep. 1, 2006, 103-115, XP055659196, ISSN: 1547-2450, DOI: 10.1080/15472450600793560 *figure 1* *pp. 106-107, section "Initial Map-Matching Process (IMP)" *.

Supplemental Partial Search Report for corresponding application EP17815937 dated Jan. 24, 2020.

European Supplemental Search Report Dated May 20, 2020 for corresponding application EP17815937.

* cited by examiner

SYSTEMS AND METHODS OF CORRELATING SATELLITE POSITION DATA WITH TERRESTRIAL FEATURES

CROSS-REFERENCE TO RELATED APPLICATIONS

This application is a divisional of U.S. patent application Ser. No. 15/984,930, filed on May 21, 2018, now U.S. Pat. No. 10,474,731, which is a continuation of U.S. patent application Ser. No. 15/618,594, filed on Jun. 9, 2017, now U.S. Pat. No. 10,002,109, which claims the benefit of U.S. Provisional Patent Application No. 62/354,183, filed on Jun. 24, 2016, all of which are hereby incorporated herein by reference for all that they disclose.

TECHNICAL FIELD

The present invention relates to data processing systems in general and more specifically to data processing systems for correlating satellite position data with terrestrial features.

BACKGROUND

Mining operations, and in particular surface mining operations, increasingly rely on the analysis of data streams transmitted by various types of mining equipment and vehicles in order to increase productivity and reduce costs. One such data stream may comprise information and data relating to the position and movement of the mining equipment and vehicles within the mining environment. Such position data are typically obtained from satellite-based position location systems, such as the GPS, Galileo, and GLONASS systems, operatively associated with the mining equipment. Alternatively, the position data may be obtained or derived from other types of position sensing systems, such as inertial-based systems or ground-based radio navigation systems.

Regardless of the particular type of position sensing system that is used, the resulting position data are subsequently transmitted to a processing system for analysis. In a typical example, the position data may be used by the processing system for fleet tracking and dispatch purposes, thereby allowing for the more efficient deployment and movement of the equipment and vehicles within the mining environment. However, other types of data analysis systems are known, and still others being developed, that rely at least in part on such position data.

One problem associated with systems that use vehicle position data relates to the problem of correlating or matching the measured position data with terrestrial features. In a mining environment, such terrestrial features may involve the road network being traveled by the vehicles. Such terrestrial features may also include other aspects of the mining environment and infrastructure system as well, such as the locations of various service buildings, fueling stations, loading locations, and dump locations, just to name a few.

The difficulties associated with correlating the measured position data with terrestrial features are due in part to inherent uncertainties and errors associated with the vehicle position location system (e.g., GPS). These uncertainties and errors may be compounded by the nature of the mining environment itself. For example, many mining environments are situated in mountainous areas which may adversely impact the accuracy of satellite-based position data. The presence of mountainous terrain may also cause the position data to include a large number of completely erroneous position fixes or 'outliers' that are located a significant distance from the actual position of the vehicle.

Besides difficulties associated with obtaining accurate position measurements, still other difficulties are associated with the configuration of the terrestrial features in the mining environment. For example, the road network in an open pit mine often contains sections of roads that are located in close proximity to one another, on closely parallel paths, and may involve comparatively complex intersections, all of which can create difficulties in properly correlating or matching the measured position of the vehicle with the correct road or location.

Still other problems are created by the dynamic nature of the mining environment itself. For example, the road network and infrastructure system are not static and are frequently changed and reconfigured as the mining operation progresses. Various roads comprising the road network are frequently moved and relocated. Similarly, elements of the mining infrastructure, e.g., service buildings, fueling stations, loading locations, and dump locations, also may be moved from time-to-time. Therefore, besides having to accurately correlate position data with known terrestrial features, a position correlation system must also be capable of accurately correlating the position data with new or relocated terrestrial features, often on a daily basis.

The failure to accurately correlate the positions of the vehicles with such terrestrial features can significantly impact the value of systems that rely on accurate position location and placement of the vehicles. For example, and in the context of a fleet tracking and dispatching system, locating a haul truck on the incorrect road can lead to incorrect dispatch decisions and/or lead to congestion problems if other vehicles are deployed on roads thought to be free of vehicles. Besides limiting the ability of fleet tracking and dispatching systems be used with optimal effectiveness, the difficulties associated with accurately correlating vehicle positions with terrestrial features limits the ability of mining operators to develop new analytical systems and tools to further improve productivity and reduce costs.

SUMMARY OF THE INVENTION

One embodiment of a method of correlating satellite position data with terrestrial features may include the steps of: Using a geometric snapping algorithm to correlate the satellite position data and terrestrial survey data and snap the satellite position data to the terrestrial features; determining whether the satellite position data can be snapped to unique terrestrial features; and using a hybrid space-time snapping algorithm to correlate the satellite position data and terrestrial survey data and snap the satellite position data to unique terrestrial features when the satellite position data cannot be snapped to unique terrestrial features.

Also disclosed is a non-transitory computer-readable storage medium having computer-executable instructions embodied thereon that, when executed by at least one computer processor cause the processor to: Use a geometric snapping algorithm to correlate the satellite position data and terrestrial survey data and snap the satellite position data to the terrestrial features; determine whether the satellite position data can be snapped to unique terrestrial features; and use a hybrid space-time snapping algorithm to correlate the satellite position data and terrestrial survey data and snap the satellite position data to unique terrestrial features when the satellite position data cannot be snapped to unique terrestrial features.

A position correlation system is also disclosed that may include: A computer processor and a user interface system operatively associated with the computer processor to allow a user to interface with the computer processor. A terrestrial survey database operatively associated with the computer processor comprises terrestrial survey data associated with terrestrial features in a defined operations area. A satellite position database operatively associated with the computer processor comprises satellite data associated with movement of at least one object within the defined operations area. A geometric snapping algorithm operatively associated with the computer processor correlates satellite position data and terrestrial survey data and snaps the satellite position data to the terrestrial features. A hybrid space-time snapping algorithm operatively associated with the computer processor correlates the satellite position data and terrestrial survey data and snaps the satellite position data to unique terrestrial features. The computer processor utilizes the geometric snapping algorithm and the hybrid space-time snapping algorithm to correlate satellite position data and the terrestrial position data, and in particular utilizes the hybrid space-time snapping algorithm when the satellite position data cannot otherwise be snapped to unique terrestrial features. The computer processor also produces output data relating to snapped satellite position data and transfers the output data to the user interface.

Another method of correlating satellite position data with terrestrial features, the locations of the terrestrial features being given by terrestrial survey data, may include the steps of: Defining a two-dimensional grid comprising a plurality of grid points at defined locations; for a plurality of locations (x,y) defined by the satellite position data, rounding the satellite position data to the nearest grid point of the defined two-dimensional grid to create an amplitude data table, each rounded satellite position data point in the amplitude data table defining a reference grid point value (gx, gy); for a plurality of locations (rx, ry) of the terrestrial features given by the terrestrial survey data, matching the terrestrial survey data to at least four adjacent grid points (gx1, gy1), (gx2, gy2), (gx3, gy3), and (gx4, gy4) of the defined two-dimensional grid to create a terrestrial coordinate table; merging the amplitude data table and the terrestrial coordinate table based on the reference grid point values (gx, gy) to form a merged table; searching the merged table to identify the grid point with the minimum distance between the (x,y) location, and the (rx, ry) location, the identified grid point comprising a snapping point; and snapping the (x,y) location to the snapping point, said snapping correlating the satellite position data and the terrestrial survey data.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
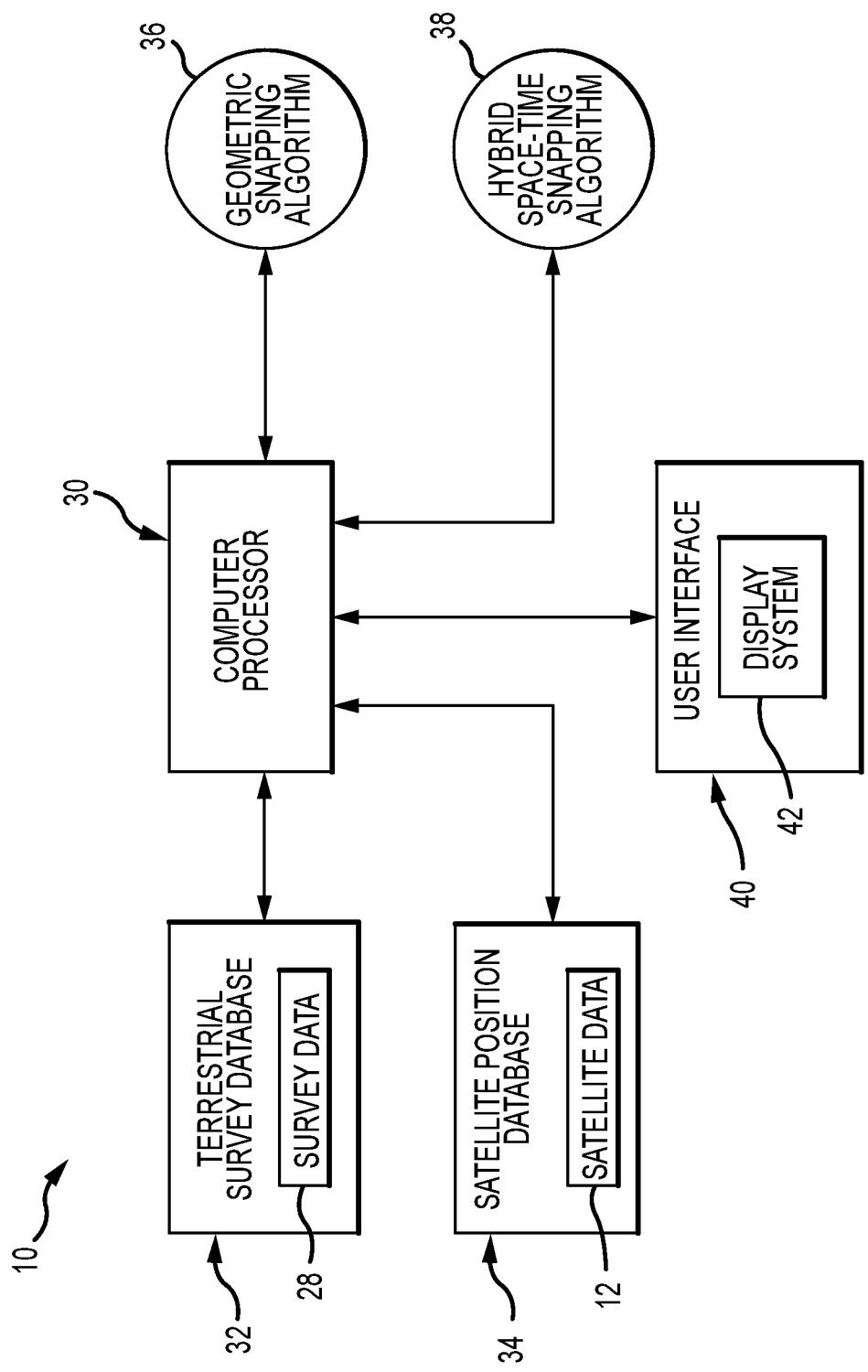
FIG. 1 is a schematic representation of one embodiment of a position correlation system according to the present invention.

One embodiment of a position correlation system 10 according to the present invention is shown and described herein as it could be used to correlate satellite position data 12 with terrestrial features 16 located within a defined operational area 18, such as an open pit mine 20 or a portion of an open pit mine 20. See FIGS. 1 and 2. In the particular embodiments shown and described herein, the terrestrial features 16 may comprise a road network 22 defined by a plurality of roads 24. The terrestrial features 16 may also comprise other aspects of a mining environment and infrastructure system 26, such as, for example, the locations of various service buildings, fueling stations, loading locations, dump locations, and the like. The locations of the terrestrial features 16 are given or represented by terrestrial survey data 28.

Figure 2:
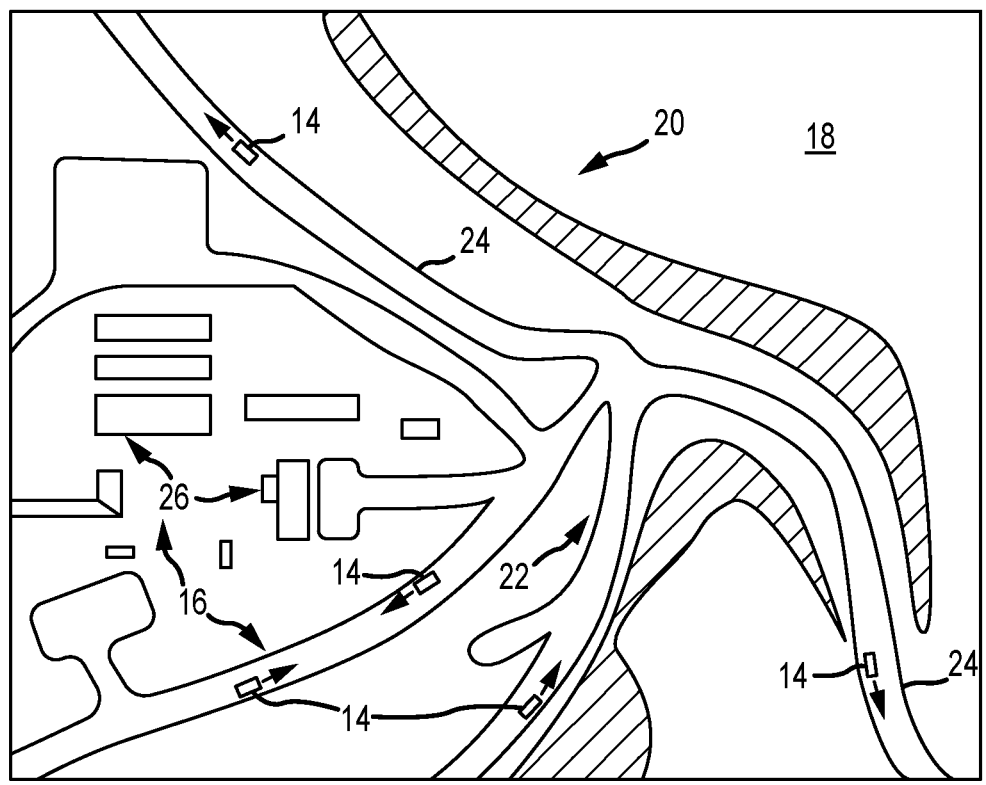
FIG. 2 is a pictorial representation of a portion of a defined operational area of an open pit mine showing various terrestrial features, including roads and buildings as well as vehicles traversing various roads.
Figure 3:
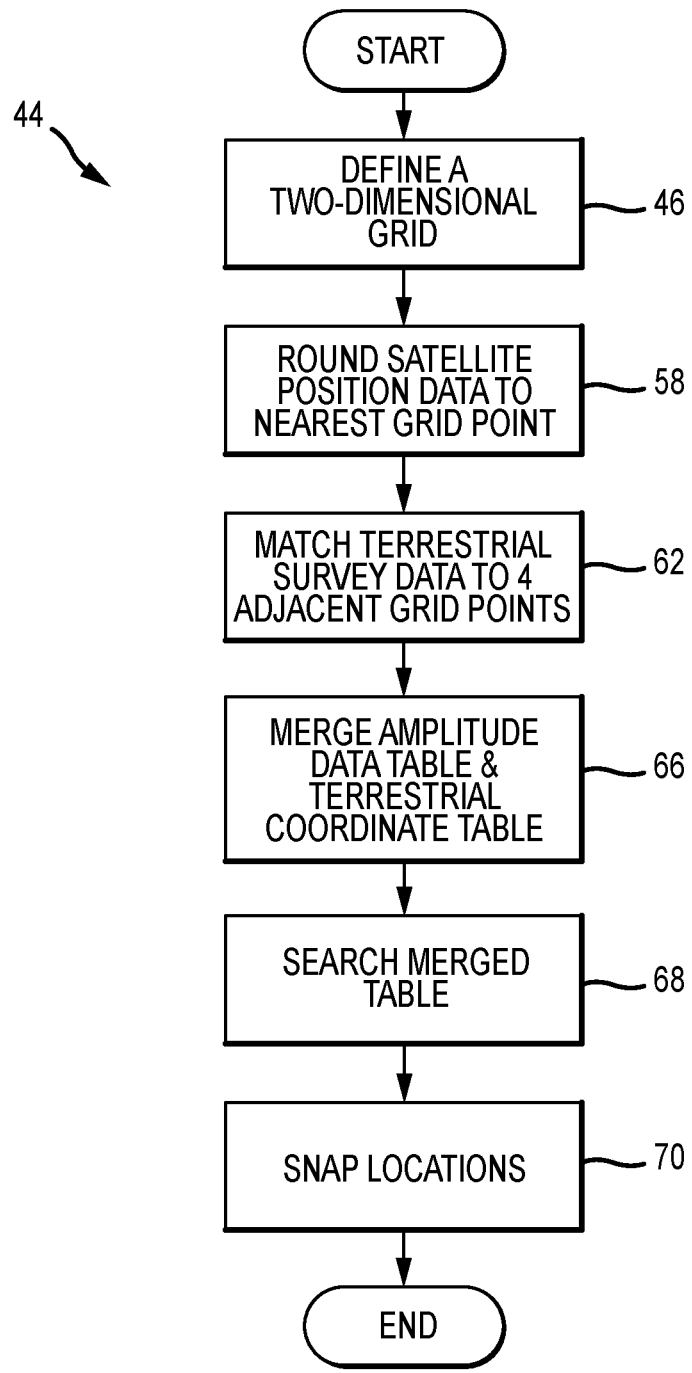
FIG. 3 is a flow chart representation of one embodiment of a geometric snapping algorithm.

With reference now primarily to FIG. 1, the position correlation system 10 may comprise a computer processor or computer processing system 30 that may be operatively connected to a terrestrial survey database 32 and to a satellite position database 34. The terrestrial survey database 32 may comprise terrestrial survey data 28 which, in one embodiment, may comprise a plurality of records or files of data that identify the locations of the terrestrial features 16, e.g., the various roads 24 of road network 22 and elements of the mining infrastructure 26. The satellite position database 34 may comprise satellite position data 12 obtained from a satellite-based position location system (e.g., GPS). The satellite position data 12 may comprise a plurality of records or files of data that identify the location of one or more vehicles 14, such as haul trucks or other mining equipment, operating within the defined operational area 18. The satellite position data may be collected over time (i.e., may comprise temporal or time-based satellite data), in which individual data points or position fixes 60 (FIG. 4) are obtained at discrete times. Accordingly, a suitable time stamp may be associated with each data point or position fix 60 comprising the satellite position data 12.

The computer processor 30 may also be operatively connected to a geometric snapping algorithm 36, a hybrid space-time snapping algorithm 38, and a user interface 40. User interface 40 may include a display system 42. As will be described in much greater detail herein, the geometric snapping algorithm 36 correlates satellite position data 12 and terrestrial survey data 28 based on spatial or positional factors. Geometric snapping algorithm 36 transforms or 'snaps' the satellite position data 12 to the terrestrial features 16. The hybrid space-time snapping algorithm 38 uses both spatial and temporal factors to make a determination about how to correlate or match the satellite position data 12 and the terrestrial survey data 28 to snap the satellite position data 12 to the correct terrestrial features 16. The hybrid space-time snapping algorithm 38 thus may be used to advantage in situations where the geometric snapping algorithm 36 is unable to correlate the satellite position data 12 and terrestrial survey data 28 because of the proximity of two or more terrestrial features 16, such as closely adjacent or parallel roads 24, or because of other factors.

The computer processor 30 produces information and data relating to the snapped position data and terrestrial features 16 (i.e., resulting from the application of the geometric snapping algorithm 36 and hybrid space-time algorithm 38). Thereafter, computer processor 30 may present the resulting information and data on the user interface 40, such as, for example on display system 42.

A significant advantage of the present invention is that it may be used to accurately and reliably correlate satellite position data with terrestrial features, particularly in situations wherein it is difficult to obtain accurate satellite position data or in situations wherein the satellite position data is apt to contain a significant number of 'outliers' or position fixes that deviate substantially from the actual position of the vehicle or object. The ability to accurately and reliably correlate the data, particular in difficult environments will allow for the use of data analysis systems heretofore thought to be unavailable for use in conjunction with such difficult environments. Moreover, the ability of the present invention to accurately correlate position data with dynamic terrestrial features, i.e., terrestrial features that are subject to frequent movement or reorientation, allows the present invention to be used in situations involving dynamic or changing terrestrial features.

Still other advantages are associated with the hybrid space-time snapping algorithm. For example, temporal traversing algorithms typically have difficulties detecting illogical path orientations and jumps while spatial traversing algorithms have difficulties ensuring the temporal sequencing of road points. The hybrid space-time snapping algorithm avoids these difficulties and provides for a far more accurate and robust snapping process. The hybrid space-time algorithm also makes use of the concept of a prime path which speeds processing and reduces the amount of trail branching that would otherwise occur. A patience window is also used to reduce the number of trail branching occurrences.

Having briefly described certain exemplary embodiments of systems and methods of the present invention, as well as some of its more significant features and advantages, various embodiments and variations of the present invention will now be described in detail. However, before proceeding the description, it should be noted that while various embodiments are shown and described herein as they could be used to correlate satellite position data with terrestrial data in a mining environment, the present invention is not limited to use with such data types and in such environments. For example, the position data need not comprise satellite position data but instead could comprise position data derived by other means, such as by inertial- or ground-based navigation systems. Also, while the present invention may be used to advantage in open pit mining environments where it is difficult to obtain accurate and reliable satellite position data and where terrestrial features are prone to frequent movement or relocation, the present invention could be used in any of a wide range of environments and for any of a wide range of purposes, some of which are described herein and others of which would become apparent to persons having ordinary skill in the art after having become familiar with the teachings provided herein. Consequently, the present invention should not be regarded as limited to use in any particular type of position data, environment, or applications.

Referring back now to FIG. 1, one embodiment of the position correlation system 10 may comprise a computer processor or computer processing system 30 that is operatively connected to the various databases and systems described herein. Computer processing system 30 may also be operatively connected to the various algorithms described herein. The various algorithms may be embodied in various software packages or modules provided on non-transitory computer-readable storage media accessible by computer system 30. The various software packages or modules are provided with computer-executable instructions that, when executed by the computer system 30, cause the computer system 30 to process information and data in accordance with the various methods and algorithms described herein. Computer system 30 may comprise any of a wide range of general purpose programmable computer systems now known in the art or that may be developed in the future that are, or would be suitable for the intended application. However, because such computer systems are well-known in the art and could be readily provided by persons having ordinary skill in the art after having become familiar with the teachings provided herein, the particular computer system 30 that may be used in the embodiments shown and described herein will not be described in further detail.

Computer system 30 is operatively connected to a terrestrial survey database 32 and a satellite position database 34. As briefly described above, the terrestrial survey database 32 may comprise terrestrial survey data 28 that identifies the locations of desired terrestrial features 16. Similarly, the satellite position database 34 may comprise the satellite position data 12 associated with the various vehicles 14 operating in the mining environment 20. Computer processing system 30 may also be operatively connected to the geometric snapping algorithm 36 and the hybrid space-time snapping algorithm 38. Computer processing system 30 also may be operatively connected to a user interface system 40 to allow a user (not shown) to operate the computer system 30. User interface system 40 may also comprise a display system 42. Computer system 30 also may be connected to a wide range of ancillary systems and devices, such as network systems, memory systems, algorithm modules, and additional databases as may be required or desired for the particular application. However, because such ancillary systems and devices are also well-known in the art and could be readily provided by persons having ordinary skill in the art after having become familiar with the teachings provided herein, the various ancillary systems and devices that may be required or desired for any particular application will not be described in further detail herein.

Considering now the various databases, the terrestrial survey database 32 may comprise terrestrial survey data 28. Terrestrial survey data 28 may comprise a plurality of records or files of data that identify and locate the position of the desired terrestrial features 16 within the defined operational area 18. As mentioned earlier, the terrestrial features 16 may include, but are not limited to, the road network 22 which is defined by a plurality of roads 24. Terrestrial features 16 may also include any desired components of the mining infrastructure system 26, such as various service buildings, fueling stations, loading stations, dump stations, stockpiles, and the like. The terrestrial survey data 28 may comprise highly accurate position data, typically produced by land-based survey systems (not shown), that locate the positions of the terrestrial features 16 within the defined operational area 18. The terrestrial survey data 28 may be updated from time-to-time as necessary to reflect changes or re-locations of the various terrestrial features 16.

The satellite position database 34 may comprise satellite position data 12. Satellite position data 12 may comprise a plurality of records or data files obtained from various equipment or vehicles 14 operating within the defined operational area 18. Each desired piece of equipment or vehicle 14 may be provided with a position sensing system (not shown) that senses the position of the vehicle 14 as it operates within the operational area 18. In the embodiments shown and described herein, the position sensing system may comprise a satellite-based position sensing system for obtaining position data from any of a wide range of satellite-based position sensing systems, such as the global positioning system (GPS). Alternatively, the position data may be obtained from other types of position sensing systems, such as from inertial sensing systems or ground-based radio navigation systems. Consequently, the present invention should not be regarded as limited to any particular type of position sensing system. Similarly, the satellite position data 12 should not be construed as limited to position data derived from satellite-based position sensing systems. That is, satellite position data 12 could comprise data obtained from other types of positioning systems.

In a typical application, the satellite position data 12 derived from the position sensing systems (not shown) provided on the various vehicles 14 may be transmitted to a central location or processing system via a wireless network (not shown). Alternatively, other systems and devices may be used. The central location or processing system may be the computer system 30, although it need not be. Thereafter, the satellite position data may be reformatted and processed, if necessary or desired, before being placed into the satellite position database 34. In this regard it should be noted that in many applications the satellite position data 12 will not be continuous but will instead a plurality of individual data points or position fixes 60 (FIG. 4) collected over time on a periodic basis (e.g., once per second). That is, the satellite position data 12 will comprise time-based or temporal position data. Therefore, each data point or position fix 60 may also include a time stamp that correlates the data point or position fix 60 with the time at which the position fix 60 was obtained.

As is known, there may be significant errors and uncertainties in the satellite position data 12 and it is not uncommon for a given satellite position fix or data point 60 to be in error by several tens, if not hundreds, of meters. These errors and uncertainties make it difficult to establish the exact location of a vehicle 14 moving within the defined operational area 18 and to correctly locate it with respect to known terrestrial features 16. In an open pit mining environment 20, e.g., with equipment or vehicles 14 traveling on roads or trails 24 within the mine, such satellite position data 12 will not reliably fix the location of the vehicle 14 on a known road or trail 24, even though the vehicle 14 is actually traveling on the known road 24.

The geometric snapping algorithm 36 may be used to compensate for the errors in the satellite position data 12 by correlating them with the terrestrial survey data 28, which are known to a much higher degree of accuracy and precision. Those satellite data position fixes or points 60 that are not correlated with the known terrestrial features (e.g., roads 24) are transferred or snapped to the correct or surveyed location of the terrestrial features 16. Other, clearly erroneous or 'outlier' position fixes 60' (FIG. 7) may be discarded entirely, as will be described in further detail below.

Referring now to FIGS. 1 and 3-9, the geometric snapping algorithm 36 may operate in accordance with a method 44 to correlate or match satellite position data 12 and terrestrial survey data 28. The geometric snapping algorithm performs the correlation based on spatial factors and then transforms or snaps the satellite position data 12 to the terrestrial features 16. The geometric snapping algorithm may be written in any of a wide range of programming languages, such as "R" or "Python" that are now known in the art or that may be developed in the future, as would become apparent to persons having ordinary skill in the art after having become familiar with the teachings provided herein. Consequently, the present invention should not be regarded as limited to any particular programming language. However, by way of example, in one embodiment, the geometric snapping algorithm 36 is written in the "R" programming language.

Before proceeding with the description of method 44, it should be noted that it is generally preferred, but not required, that the geometric snapping algorithm 36 utilize a road coordinate system, rather than a mine coordinate system or a coordinate system based on latitude and longitude. Use of a road coordinate system facilitates precise comparison, day after day, as various terrestrial features 16 may be moved or relocated from time-to-time. Each point in the road coordinate system may be defined by a start call-point, an end call-point, a distance to the start call-point, and a distance to the end call-point. The distances may be provided in any convenient units, such as meters or feet, and may be chosen to be integer values. In the particular embodiment shown and described herein, the call-points are separated by a distance of about 9.1 m (about 30 ft). Curvilinear distances may be measured along Bezier curves. Thus, the road coordinate system uses only strings and integers.

Figure 4:
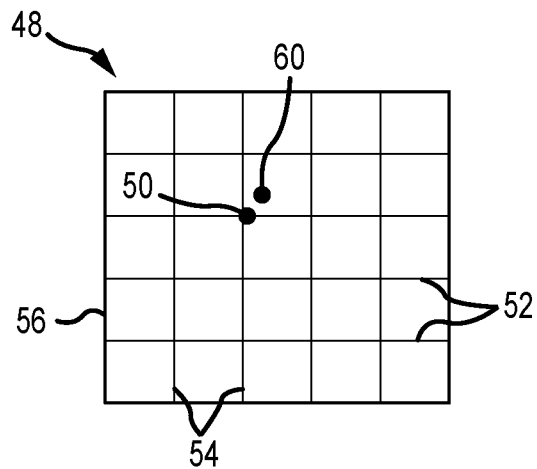
FIG. 4 is a pictorial representation showing the location of a satellite position data point or fix in relation to a defined two-dimensional grid.
Figure 5:
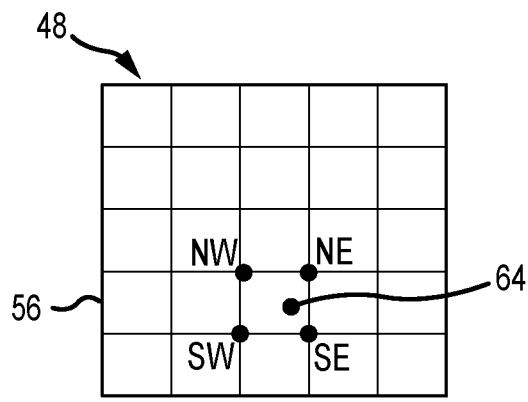
FIG. 5 is a pictorial representation showing the location of a terrestrial data point or fix in relation to the defined two-dimensional grid.

A first step 46 in method 44 defines a two-dimensional grid 48, as best seen in FIG. 4. Two-dimensional grid 48 may comprise a plurality of grid points 50 at defined locations, i.e., at the intersections of respective 'horizontal' and 'vertical' gridlines 52 and 54, respectively. It should be noted that the horizontal and vertical gridlines 52 and 54 are constructs only and are used herein as an aid to understanding various steps of method 44. In one embodiment, the respective horizontal and vertical gridlines 52 and 54 are spaced at equal intervals that correspond to a terrestrial distance of about 91.4 m (about 300 ft). Accordingly, the two-dimensional grid 48 will comprise a grid of squares 56, wherein each square corresponds to a terrestrial area of about 8361 $m^2$ (about 90,000 $ft^2$). Alternatively, of course, other dimensions could be used.

In a next step 58 of method 44, each data point or position fix 60 in the satellite position data 12 is 'rounded' to the nearest grid point 50 of two-dimensional grid 48. The location of each data point or position fix 60 may be defined by respective x and y locations with respect to the two-dimensional grid 48. For example, and with reference to FIG. 4, the x-y locations associated with each position fix 60 will be 'rounded' to grid point 50 to define a reference grid point value, given by coordinates values gx and gy. All of the rounded coordinate values (i.e., gx and gy values) are then used to create an amplitude data table.

Proceeding now to step 62, each location or data point 64 in the terrestrial survey data 28 is matched to at least four adjacent grid points, designated herein as 'NW,' 'NE,' 'SE,' and 'SW,' for northwest, northeast, southeast, and southwest, in grid 48. The location of each data point 64 in the terrestrial survey data 28 may be designated by coordinate values rx and ry. The coordinate values for the respective adjacent grid points NW, NE, SE, and SW may be referred to herein in the alternative as (gx1, gy1), (gx2, gy2), (gx3, gy3), and (gx4, gy4), respectively. The matched values for each terrestrial data point 64 are then used to create a terrestrial coordinate table.

Figure 8:
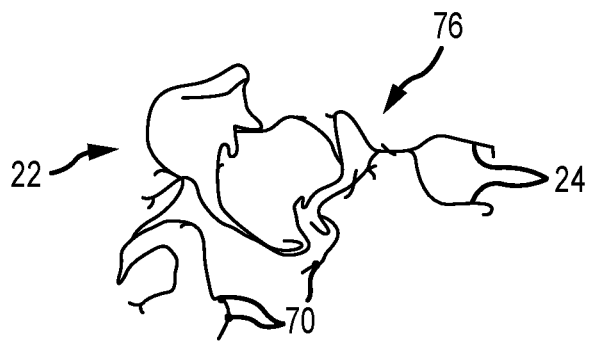
FIG. 8 is a pictorial representation of the post-snapped-on coordinates produced by satellite data points of FIG. 7 snapped to the road network of FIG. 6.
Figure 9:
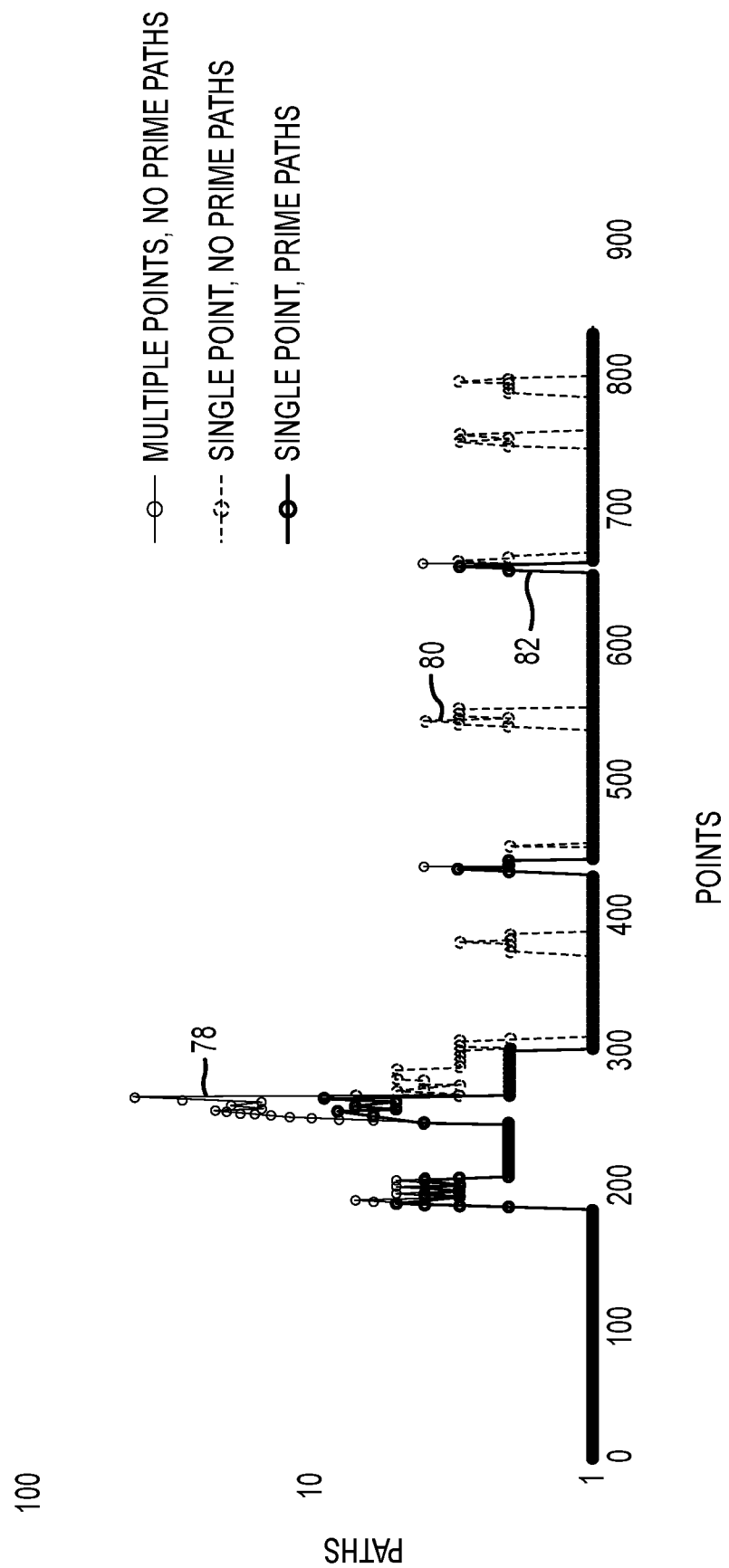
FIG. 9 is a pictorial representation illustrating the reduction in possible trails available for snapping made possible by the hybrid space-time snapping algorithm.

Next, in step 66, the amplitude data table (created in step 58) and the terrestrial coordinate table (created in step 62) are merged based on the reference grid point values (i.e., gx and gy) to form or create a merged table. Thereafter, the merged table is searched in step 68 to identify that grid point 50 with the minimum distance between the x,y location of the position fix 60 and the rx, ry location of terrestrial data point 64. The identified grid point 50 is referred to herein as a snapping point. In step 70, the x,y location (i.e., of position fix 60) is snapped to the snapping point 70 (FIG. 8). In one embodiment, the snapping step 70 is conducted only when the distance between the x,y location and the rx, ry location is equal to or less than a terrestrial distance of about 46 m (about 150 ft).

The geometric snapping algorithm 36 may be used to snap the satellite position data 12 to the terrestrial features 16 given by the terrestrial survey data 28. In addition, number of points or coordinates of the post snapped-on data will be significantly reduced, reducing memory and processing requirements. For example, and with reference now to FIG. 6, a road network 22 comprising various roads 24 may be represented by about 7000 individual data points 64 in the road coordinate system. These data points 64 generally are of high accuracy, having been derived or produced by a ground-based survey system. The data points 64 comprise a portion of the terrestrial survey data 28 stored in the terrestrial survey database 32. See also FIG. 1. One or more vehicles 14 (FIG. 2) provided with position location systems traveling on the roads 24 of road network 22 will produce a plurality of position fixes or points 60 in the manner already described. The position fixes 60 are representative of the various positions of the vehicle 14 at defined points in time as it travels the road network 22. In the particular example depicted in FIG. 7, 15,115 individual position fixes 60 were used to generate a corresponding satellite data 'map' 72 for the road network 22. That is, the map 72 of road network 22 depicted in FIG. 7 is based on the satellite data points 60, not on the terrestrial data points 64, as was the case for the map 74 depicted in FIG. 6. Map 74 may be referred to herein in the alternative as terrestrial data map 74. As already described, the data points 60 comprise a portion of the satellite position data 12 stored in the satellite position database 34.

Figure 6:
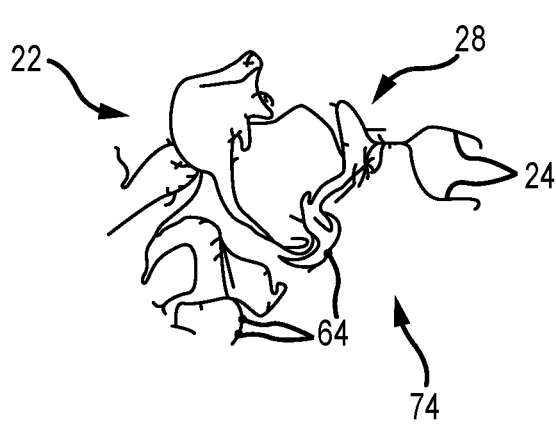
FIG. 6 is a pictorial representation of terrestrial data points of a road network.
Figure 7:
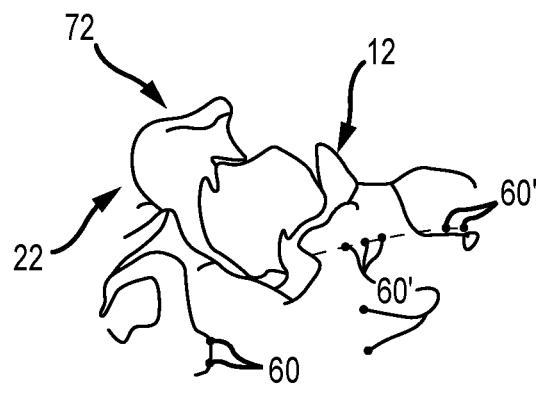
FIG. 7 is a pictorial representation of satellite data points or fixes obtained from a vehicle traveling on some of the roads of the road network of FIG. 6.

With reference now to FIGS. 6 and 7 simultaneously, the satellite position data 12 presented in satellite map 72 of FIG. 7 contains a number of clearly erroneous or 'outlier' data points 60' that do not correspond to any road 24 of road network 22 defined by the terrestrial data map 74 depicted in FIG. 6. These outlier data points or erroneous position fixes 60' are identified and removed by application of the geometric snapping algorithm 36.

For example, and as best seen in FIG. 8, the geometric snapping algorithm 36 snaps to the road coordinate system the satellite position data 12. During the snapping operation, i.e., the execution of method 44, individual position fixes 60 that are on or nearby the terrestrial features 16 defined by the terrestrial survey data 28 will be snapped. However, the outlier or erroneous position fixes 60' will be identified and discarded. The snapping operation of method 44 results in the production of post snapped-on coordinate points 70 that coincide with the road coordinate system. The map 76 of the individual roads 24 traveled by the vehicle(s) 14 illustrated in FIG. 8 is defined by 3657 individual snapped-on coordinate points 70. The production of the snapped-on coordinate points 70 represents a significant reduction in the data required to record the movement of the vehicle(s) 14 on road network 22: From 15,115 individual satellite position fixes 60, to 3657 snapped-on points 70. It should be noted that the geometric snapping algorithm 36 retains the time-stamp data associated with each snapped-on data point 70, thereby allowing subsequent data processing systems and algorithms to use the position and time data, if desired or required. It should also be noted that the snapped on data points 70 represent only those roads 24 of road network 22 that were actually traveled by the vehicle(s) 14. Roads that were not traveled are not depicted by the map 76 generated by the snapped on data points 70.

The geometric snapping algorithm 36 may be used to correlate the satellite position data 12 and terrestrial survey data 28 based on spatial or positional factors in the manner just described. However, there are situations that can develop wherein the geometric snapping algorithm 36 will be unable to correlate the satellite position data 12 and terrestrial survey data 28 and 'snap' the satellite position data 12 to a unique terrestrial feature 16 because of the proximity of two or more terrestrial features 16 or other factors. That is, because the squares 56 of the two-dimensional grid of squares 48 are relatively coarse (e.g., with dimensions in one embodiment of about 91.4 m on each side), difficulties can develop is where two or more terrestrial features 16 are located closer together than the dimensions of the squares 56, such as two or more roads 24 that are located on parallel paths or at road intersections. See FIG. 2. In such instances, the geometric snapping algorithm 36 may be unable to correlate the satellite position fixes 60 with the correct terrestrial feature 16. The method and system of the present invention may then utilize the hybrid space-time snapping algorithm 38 to resolve the uncertainties and determine the correct terrestrial feature 12 (e.g., road 24) to snap to.

The hybrid space-time snapping algorithm 38 uses both spatial and temporal factors to make a determination about how to correlate the satellite position data 12 and the terrestrial survey data 28 to snap the satellite position fixes to the correct terrestrial feature 16. The hybrid space-time snapping algorithm 38 may be used to advantage because temporal traversing algorithms typically have difficulties detecting illogical path orientations and jumps, while spatial traversing algorithms have difficulties ensuring temporal sequencing of road points. The hybrid space-time snapping algorithm 38 thus comprises two components or aspects: A spatial traversing component and a temporal traversing component.

The spatial traversing component of the hybrid space-time snapping algorithm 38 connects small segments into longer paths, identifies 'prime paths' and 'prunes' terminal branches. In the temporal traversing component of the hybrid space-time snapping algorithm 38, trail traversing is performed over road coordinate points, not position fix data points 60 (FIG. 4). As will be described in further detail below, the selection of trails is based on a spatial-temporal score (STA). Trail choices are optimized at each step, which means that the algorithm 38 avoids the exponential growth of the number of trails. The temporal traversing component also ensures the appropriate time sequencing of the snapped points.

The hybrid space-time snapping algorithm 38 may be written in any of a wide range of programming languages, such as "R" or "Python" that are now known in the art or that may be developed in the future, as would become apparent to persons having ordinary skill in the art after having become familiar with the teachings provided herein. Consequently, the present invention should not be regarded as limited to any particular programming language. However, by way of example, in one embodiment, the hybrid space-time snapping algorithm 38 is written in the Python programming language.

The terms used to describe the hybrid space-time snapping algorithm 38 include "walk," "trail," "endpoint," and "path." A walk is a sequence of vertices and edges, where the endpoints of each edge are the preceding and following vertices in the sequence. A trail is a walk in which all of the edges are distinct. An endpoint is either a terminal point or a junction vertex node, and a path is a set of connected road segments that extend from one endpoint to another endpoint.

The spatial traversing component of the hybrid space-time snapping algorithm 38 identifies a prime path as any path with more than a defined time (e.g., 10 seconds) of satellite position data fixes 60 being the sole choice of snappable points. That is, during trail traversing, when a prime path is encountered, there is no need for hesitation. The algorithm 38 simply snaps the points 60 to the identified prime path. Further, for each snappable road coordinate point, there is a moment in time where the satellite position fix or point 60 is closest in distance to it. The time stamp associated with that particular satellite position fix 60 is referred to as a periapsis time stamp and is used to facilitate the snapping process.

The spatial traversing component of the hybrid space-time snapping algorithm 38 utilizes the following logic or methodology to implement the snapping function. During the trail traversing operation, when a new path becomes snappable, the various position fixes 60 could either be snapped right away, or delayed for some period of time. This means that an original trail will be duplicated into two trails, referred to herein as trail branching. Without placing some bounds on the period of time, the trail branching operation could lead to the growth of a significant number of possible trails. In order to avoid this undesirable growth, the spatial traversing component of the hybrid space-time algorithm 38 utilizes a "patience window." If the patience window has expired, then the points 60 are snapped, thereby limiting trail branching. In one embodiment, the patience window is selected to be about 10 seconds, although other time periods could be used.

Another methodology used by the spatial traversing component relates to intersections. More specifically, at an intersection of 3 or more paths, if the vehicle travels along two paths, then all the other paths are removed from any further snapping consideration. Moreover, if multiple points from the same path are available at the same time, only the closest point will be snapped. That is, there will be no trail branching from points from the same path. Finally, and as mentioned above, if a prime path becomes snappable, there is no further hesitation. The points will be snapped to the prime path.

This logical snapping process significantly reduces the possible number of trails available for snapping. For example, and with reference now to FIG. 9, a logical snapping process that does not restrict multiple points to the closest point and also that does not define prime paths involves a significant number of possible trails, as depicted by line 78 in FIG. 9. The significant number of possible trails slows the snapping algorithm 38 and increasing the likelihood of errors, e.g., snapping to the wrong trail. A second logical snapping process that does restrict multiple points to the closest point but still does not involve prime paths reduces the number of possible trails somewhat, but they are still significant in number, as depicted by line 80. However, the logical snapping process utilized in the embodiments shown and described herein, i.e., that restricts multiple points to the closest point and that utilizes prime paths significantly reduces the number of possible trails. This logical snapping process is depicted by line 82 in FIG. 9.

Considering now the temporal component of the hybrid space-time algorithm 38, the temporal component uses a spatial-temporal score (STS) to snap the satellite position data point or position fix 60 (FIG. 7) to the road 24 actually traversed by the vehicle 14. The spatial-temporal score (STS) comprises determining each of a spatial-proximity value (SPV), a spatial-evenness value (SEV), and a temporal-evenness value (TEV). The STS is then determined by taking the third root of the product of the SPV, the SEV, and the TEV.

The SPV value is given by the following equation:

$$SPV = \exp(-1/2 * (\text{average error distance}/30)^2)$$

The spatial-evenness value (SEV) is determined from the distribution of snapping error distances (N) and is the ratio of the effective number of snapping error distances (Neff) and the number of snapping error distances N, i.e., the spatial-evenness value, SEV=Neff/N. The Inverse Herfindahl Index is used to determine Neff. As is known the Inverse Herfindahl Index is given by the "square of the sums" divided by the "sum of the squares." The temporal-evenness value (TEV) is measured from the distribution of time differences between consecutive snapped road points.

The final snapping operation is done primarily in the time dimension. Time sequencing of road coordinates is rationalized first according to the following rationale. First, the hybrid space-time algorithm 38 sorts by average timestamp of the road segments first, then by the coordinate sequence index within each road segments.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of correlating satellite position data with terrestrial features, the locations of the terrestrial features being given by terrestrial survey data, the method comprising:

defining a two-dimensional grid comprising a plurality of grid points at defined locations;

for a plurality of locations (x,y) defined by the satellite position data, rounding the satellite position data to the nearest grid point of the defined two-dimensional grid to create an amplitude data table, each rounded satellite position data point in the amplitude data table defining a reference grid point value (gx, gy);

for a plurality of locations (rx, ry) of the terrestrial features given by the terrestrial survey data, matching the terrestrial survey data to at least four adjacent grid points (gx1, gy1), (gx2, gy2), (gx3, gy3), and (gx4, gy4) of the defined two-dimensional grid to create a terrestrial coordinate table;

merging the amplitude data table and the terrestrial coordinate table based on the reference grid point value (gx, gy) to form a merged table;

searching the merged table to identify a grid point of the plurality of grid points with a minimum distance between an (x,y) location of the plurality of locations (x,y) and an (rx, ry) location of the plurality of locations (rx, ry), the identified grid point comprising a snapping point; and snapping the (x,y) location to the snapping point, said snapping correlating the satellite position data and the terrestrial survey data.

2. The method of claim 1, wherein said defining the two-dimensional grid comprises defining a two-dimensional grid of squares.

3. The method of claim 2, wherein the side of each square grid of the two-dimensional grid of squares corresponds to a terrestrial length about of 300 feet or about 91 meters.

4. The method of claim 2, wherein said snapping is conducted only when the distance between the (x,y) location and the (rx, ry) location is equal to or less than a terrestrial distance of about 150 feet or about 46 meters.

5. The method of claim 1, wherein the at least four adjacent grid points (gx1, gy1), (gx2, gy2), (gx3, gy3), and (gx4, gy4) of the defined two-dimensional grid comprise southwest, northwest, southeast, and northeast terrestrial grid points, respectively.

6. The method of claim 1, wherein each location of the terrestrial features is defined by a terrestrial coordinate system comprising:
 a start call-point;
 an end call-point;
 a distance to start call-point; and
 a distance to end call-point.

7. The method of claim 6, wherein the distances to the start and end call-points are integers.

8. The method of claim 7, wherein at least some of the distances to the start and end call-points are curvilinear distances and wherein the curvilinear distances are measured along Bezier curves.

9. A non-transitory computer-readable storage medium having computer-executable instructions embodied thereon that, when executed by at least one computer processor, cause the processor to:

define a two-dimensional grid comprising a plurality of grid points at defined locations;

for a plurality of locations (x,y) defined by satellite position data, round the satellite position data to the nearest grid point of the defined two-dimensional grid to create an amplitude data table, each rounded satellite position data point in the amplitude data table defining a reference grid point value (gx, gy);

for a plurality of locations (rx, ry) of terrestrial features given by terrestrial survey data, match the terrestrial survey data to at least four adjacent grid points (gx1, gy1), (gx2, gy2), (gx3, gy3), and (gx4, gy4) of the defined two-dimensional grid to create a terrestrial coordinate table;

merge the amplitude data table and the terrestrial coordinate table based on the reference grid point value (gx, gy) to form a merged table;

search the merged table to identify a grid point of the plurality of grid points with a minimum distance between an (x,y) location of the plurality of locations (x,y) and an (rx, ry) location of the plurality of locations (rx, ry), the identified grid point comprising a snapping point; and snap the (x,y) location to the snapping point, said snap correlating the satellite position data and the terrestrial survey data.

* * * * *